(12) United States Patent
Denmead et al.

(10) Patent No.: US 11,618,226 B2
(45) Date of Patent: Apr. 4, 2023

(54) SHAPED PREFORM FOR FACE PORTION OF A COMPOSITE WHEEL

(71) Applicant: CARBON REVOLUTION LIMITED, Waurn Ponds (AU)

(72) Inventors: Ashley James Denmead, Belmont (AU); Michael Dunbar Silcock, Wallington (AU); Timothy Corbett, Highton (AU); Nicholas Taylor, Waurn Ponds (AU); Steven Agius, Belmont (AU); Barry Trippit, Glen Iris (AU)

(73) Assignee: Carbon Revolution Limited, Waurn Ponds (AU)

( * ) Notice: Subject to any disclaimer, the term of this patent is extended or adjusted under 35 U.S.C. 154(b) by 483 days.

(21) Appl. No.: 16/639,487

(22) PCT Filed: Aug. 17, 2018

(86) PCT No.: PCT/AU2018/050876
§ 371 (c)(1),
(2) Date: Feb. 14, 2020

(87) PCT Pub. No.: WO2019/033173
PCT Pub. Date: Feb. 21, 2019

(65) Prior Publication Data
US 2020/0406671 A1 Dec. 31, 2020

(30) Foreign Application Priority Data
Aug. 18, 2017 (AU) .................. 2017903324

(51) Int. Cl.
*B60B 3/00* (2006.01)
*B29C 70/86* (2006.01)
(Continued)

(52) U.S. Cl.
CPC ............ *B29C 70/865* (2013.01); *B29C 70/30* (2013.01); *B60B 3/004* (2013.01); *B60B 3/02* (2013.01);
(Continued)

(58) Field of Classification Search
CPC .... B60B 3/10; B60B 3/02; B60B 5/02; B60B 7/061; B29C 70/24; B29C 70/30; B29C 70/28
See application file for complete search history.

(56) References Cited

U.S. PATENT DOCUMENTS 3,917,352 A * 11/1975 Gageby .................. B29C 70/24
301/64.702
4,294,490 A * 10/1981 Woelfel .................... B60B 5/02
428/113
(Continued)

FOREIGN PATENT DOCUMENTS

JP   S61-095907 A   5/1986
JP   S61-135801 A   6/1986
(Continued)

*Primary Examiner* — Hau V Phan
(74) *Attorney, Agent, or Firm* — RatnerPrestia (57) ABSTRACT

A shaped preform component (200) for a face portion (104) of a composite wheel (100), the shaped preform (200) having a hub (206) that extends around a central axis (Y), the shaped preform component (200) being formed from a cured composite fibre material having a compressibility of <2% volumetric under moulding conditions of 50 bar hydrostatic pressure and a temperature of 60 to 200° C.

20 Claims, 5 Drawing Sheets

(51) Int. Cl.
  *B29C 70/30* (2006.01)
  *B60B 3/10* (2006.01)
  *B60B 7/06* (2006.01)
  *B60B 3/02* (2006.01)
  *C08K 3/04* (2006.01)
  *C08K 3/36* (2006.01)
  *C08K 7/06* (2006.01)
  *C08K 7/28* (2006.01)
  *C08L 63/00* (2006.01)
  *B60B 5/02* (2006.01)
  *B29K 307/04* (2006.01)
  *B29L 31/32* (2006.01)

(52) U.S. Cl.
  CPC .............. *B60B 3/10* (2013.01); *B60B 5/02* (2013.01); *B60B 7/061* (2013.01); *C08K 3/04* (2013.01); *C08K 3/36* (2013.01); *C08K 7/06* (2013.01); *C08K 7/28* (2013.01); *C08L 63/00* (2013.01); *B29K 2307/04* (2013.01); *B29L 2031/32* (2013.01); *B60B 2310/204* (2013.01); *B60B 2310/52* (2013.01); *B60B 2360/346* (2013.01); *B60B 2360/36* (2013.01)

(56) References Cited

U.S. PATENT DOCUMENTS

| | | | |
|---|---|---|---|
| 4,302,155 A | 11/1981 | Grimes et al. | |
| 4,376,749 A * | 3/1983 | Woelfel | B60B 5/02 156/184 |
| 4,514,013 A * | 4/1985 | Woelfel | B29C 70/00 301/65 |
| 4,583,933 A * | 4/1986 | Woelfel | B29C 70/28 425/383 |
| 4,721,342 A * | 1/1988 | Daniels | B29C 70/34 301/64.703 |
| 5,564,793 A | 10/1996 | Whiteford | |
| 5,588,392 A * | 12/1996 | Bailey | B29C 70/48 425/389 |
| 5,647,642 A | 7/1997 | Word | |
| 6,312,059 B1 | 11/2001 | Stach | |
| 6,347,839 B1 * | 2/2002 | Lew | B60B 21/062 301/95.102 |
| 6,365,257 B1 * | 4/2002 | Hecht | C04B 35/83 428/37 |
| 6,416,135 B1 * | 7/2002 | Greubel | B60B 5/02 301/35.625 |
| 6,991,298 B2 * | 1/2006 | Ording | B60B 5/02 29/894.35 |
| 7,681,958 B1 | 3/2010 | Bagdasarian | |
| 8,132,494 B1 * | 3/2012 | Nguyen | B32B 5/12 89/922 |
| 8,926,025 B2 * | 1/2015 | Fior | B60B 1/10 301/35.59 |
| 8,992,813 B2 * | 3/2015 | Robbins | B29C 70/086 264/296 |
| 9,108,461 B2 * | 8/2015 | Kismarton | B60B 3/082 |
| 9,421,821 B2 * | 8/2016 | Phadatare | B60B 3/10 |
| 9,662,932 B2 * | 5/2017 | Dingle | B60B 1/14 |
| 9,707,800 B2 * | 7/2017 | Stratton | B60B 7/065 |
| 9,840,110 B2 * | 12/2017 | Dingle | B32B 5/26 |
| 2004/0255462 A1 * | 12/2004 | Schroeder | B60B 1/14 29/894.38 |
| 2005/0121970 A1 | 6/2005 | Adrian | |
| 2010/0019564 A1 * | 1/2010 | Theuer | B29C 70/347 301/64.703 |
| 2013/0026816 A1 | 1/2013 | Kia et al. | |
| 2014/0292026 A1 | 10/2014 | Salvaggio, Jr. | |
| 2015/0231917 A1 | 8/2015 | Dressler et al. | |
| 2015/0360509 A1 | 12/2015 | Werner et al. | |
| 2016/0193869 A1 | 7/2016 | Renner et al. | |
| 2016/0221385 A1 * | 8/2016 | Noweihed | B60B 3/10 |
| 2016/0311252 A1 * | 10/2016 | Werner | B60B 23/06 |
| 2016/0332391 A1 * | 11/2016 | Werner | B29C 70/32 |
| 2017/0037870 A1 * | 2/2017 | Cahill | F04D 29/388 |
| 2017/0050392 A1 * | 2/2017 | Werner | B60B 3/02 |
| 2020/0406674 A1 | 12/2020 | Denmead et al. | |

FOREIGN PATENT DOCUMENTS

| | | |
|---|---|---|
| JP | H02-057401 A | 2/1990 |
| WO | WO-2010/024495 A1 | 3/2010 |
| WO | WO-2010/025495 A1 | 3/2010 |
| WO | WO-2013/083729 A2 | 6/2013 |
| WO | WO-2014/016211 A1 | 1/2014 |
| WO | WO-2014/165895 A9 | 10/2014 |
| WO | WO-2015/158780 A1 | 10/2015 |
| WO | WO2019/033175 A1 | 2/2019 |

\* cited by examiner

SHAPED PREFORM FOR FACE PORTION OF A COMPOSITE WHEEL

CROSS-REFERENCE TO RELATED APPLICATIONS

The present application is a U.S. National Stage of International Application No. PCT/AU2018/050876, filed Aug. 17, 2018, which claims priority from Australian Provisional Patent Application No. 2017903324, filed on Aug. 18, 2017, the contents of which should be understood to be incorporated into this specification by this reference.

TECHNICAL FIELD

The present invention generally relates to a shaped preform for use in the production of the face portion of a composite wheel. The invention is particularly applicable to composite carbon fibre wheels for vehicles and/or aeroplanes and it will be convenient to hereinafter disclose the invention in relation to that exemplary application. However, it is to be appreciated that the invention is not limited to that application and could be used as a production aid in of a large variety of composite type wheels.

BACKGROUND OF THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

A composite wheel generally includes two main sections, a rim portion and a face portion. The rim portion comprises an annulus structure configured to receive and seat a tyre. The face portion includes a hub which is used to fix the wheel to the vehicle, and a connection structure such as a series of spokes or a disc which extends between and interconnects the hub and the rim. Lateral, vertical and torsional loads are transmitted through the tyre to the rim portion of the wheel which then produce bending and torsional stresses in the connection structure.

The Applicant has produced a one-piece composite wheel, which is described, for example, in International Patent Publication WO2010/024495A1. The creation of a one-piece composite wheel generally necessitates use of a separate rim portion mould and associated reinforcement and face portion mould and associated reinforcement. The separate rim and face mould portions are then interconnected in a final moulding process which allows the overall composite wheel to be integrally formed. A stiff, strong and dimensionally stable face portion, in particular the hub portion and its interconnection with the spokes is desired to provide a mechanically efficient structure having stiffness and strength and also efficiently transmit loads generated between the tyre and road, through the rim to the spokes and through to the axle of the vehicle.

The hub portion of the face portion of a composite wheel has previously been formed using a layup of selected cut and shaped fibre sheets or pre-pegs, or using a cast, machined or manual shaped foam (polyurethane or other high density closed cell foam) insert. Neither method has been found to produce a volumetrically stable body once the part is moulded and cured. Once laminated between fibre layers, current foam inserts do not support and/or constrain movement of the upper and lower fibre layers during subsequent moulding and in-service loading. Furthermore, dry fiber layer layup stacks have been found to produce manufacturing defects resulting from volumetric shrinkage leading to surface finish defects and internal cracking.

It would therefore be desirable to provide an improved or alternate shaped preform/insert that can be utilised when forming the face portion of a composite wheel.

SUMMARY OF THE INVENTION

The present invention provides a layup aid for fitment into the fibre layup of the face portion of a composite wheel, preferably a carbon fibre wheel.

The present invention provides in a first aspect, a shaped preform component for a face portion of a composite wheel, the shaped preform having a hub that extends around a central axis, the shaped preform component being formed from a cured composite fibre material having a compressibility of <2% volumetric under moulding conditions of 50 bar hydrostatic pressure and a temperature (process temperature) of 60 to 200° C.

It should be understood that the term "composite" herein denotes any type of composite material comprising fibres, cured or uncured, irrespective of the structure being layered or not. Furthermore, pre-forms and pre-consolidated preforms cured or uncured are important subgroups of composite materials and bodies.

It should also be understood that the term "cured" in "cured composite fibre material" indicates that the composite fibre material has undergone at least a partial curing process to harden, cure or set a curable matrix material in the composite fibre material.

The present invention therefore provides a shaped preform that can used in a layup and moulding process for forming the face portion of a composite wheel that is designed to have minimal volume change. The use of a preform according to the present invention is intended to aid the formation of the requisite configuration of the face portion, whilst not providing significant special considerations in the overall wheel moulding process. The shaped preform provides a layup aid during layup of the composite fibres and fabrics of the hub and face portion of the composition wheel.

The cured composite fibre material provides structural rigidity and/or solidity to the preform, which can be utilised to retain the designed configuration of that preform in the shape and form of the overall composite wheel. The shaped preform therefore has limited compressibility to enable the provision of an appropriate volume and minimal volume change during layup and moulding of the face portion of the composite wheel. Use of the shaped preform of the present invention in the layup of a face portion of a composite wheel therefore minimises and more preferably avoids undesirable dimensional and volume changes that could damage the structure of the moulded composite wheel. It should be appreciated that the compressibility of the shaped preform is a % volumetric measurement under moulding conditions of 50 bar hydrostatic pressure (for example during resin injection) and a process temperature range of 60 to 200° C. during a resin moulding process such as a resin transfer moulding (RTM) process.

The process temperature during moulding conditions can vary depending on the preferred injection and cure temperature. The preferred process temp is about 120° C. (typically 120° C.+/−3 C). However, the process temperature can be in the range 60 to 180° C., preferably 60 to 150° C., more preferably 60 to 140° C. In embodiments, the process temperature is from 100 to 200° C., preferably 100 to 150° C., more preferably 100 to 130° C. In embodiments, the process temperature is from 110 to 150° C., preferably 110 to 130° C.

Furthermore, (as explained in further detail below) the use of a cured composite fibre material allows for the material to substantially match the composite fibre material used in the wheel, therefore giving the preform similar thermal and expansion properties as the surrounding composite layup material of the composite wheel.

The mechanical properties of the shaped preform of the present invention can be tailored to a desired application. As outlined above, the compressibility of the composite fibre body must be <2% volumetric under moulding conditions of 50 bar hydrostatic pressure. In some embodiments, the compressibility of the shaped preform is <1.5%, preferably <1% volumetric under moulding conditions of 50 bar hydrostatic pressure. The process temperature of moulding conditions is the same as indicated previously.

Other mechanical properties of the shaped preform of interest include:

Density—which is preferably between 600 and 1300 kg/m$^3$, and more preferably from 800 to 1200 kg/m$^3$. In some embodiments, the density of the shaped preform is from 500 and 1500 kg/m$^3$. In some embodiments, the density of the shaped preform is from 600 and 1400 kg/m$^3$. In some embodiments, the density of the shaped preform is from 800 and 1500 kg/m$^3$;

Tensile Strength—which is preferably between 20 and 80 MPa, more preferably from 20 and 60 MPa. In some embodiments, the tensile strength is from 30 to 80 MPa, preferably from 30 to 60 MPa. In some embodiments, the tensile strength is from 20 to 70 MPa, preferably from 40 to 70 MPa;

Stiffness—which is preferably from 1.5 to 30 GPa, preferably from 5 to 30 GPa, more preferably from 8 to 30 GPa, yet more preferably 10 to 25 GPa. In some embodiments, the stiffness is from 1.5 to 10 GPa. In other embodiments, the stiffness is from 8 to 25 GPa. In some embodiments, the stiffness is from 2 to 30 GPa, preferably from 10 to 25 GPa.

In some embodiments, the shaped preform has a stiffness of about 4 GPa and a tensile strength of about 50 MPa.

The surface of the shaped preform preferably has a roughened surface having a roughness of at least Ra=0.2 µm. This surface roughness assists the shaped preform to bond with the surrounding material of the hub portion of a composite wheel when placed in the fibre layup of that hub portion. The roughened surface can be formed by any suitable means. In some embodiments, the roughened surface comprises a chemically etched surface, mechanically abraded surface or specially textured surface.

The thermal expansion properties of the shaped preform is preferably designed to be similar, preferably substantially match the thermal expansion properties of the overall composite material of the face portion of a composite wheel that the shaped preform is configured to be included therein. Similar or substantially matched thermal expansion properties of the shaped preform and the surrounding material (typically a laminate) avoids material damage such as delamination at the surface of the shaped preform during a post cure process. The thermal performance (and mechanical properties) of the shaped preform therefore matches the surrounding wheel structure.

The shaped preform can be formed from any number of different materials which include or can be bound by a curable matrix material, for example a resin to form the cured composite fibre material.

In some embodiments, the shaped preform is formed from resin (pure resin) or is substantially formed from resin only.

In some embodiments, the shaped preform is formed from at least one of: Tailored Fibre Placement plies or preforms; One or more layers of single fibre direction plies (Unidirectional); One or more layers of multi directional fibre plies (e.g. stitched Non-crimp fabric); or Fibre Patch Placement (FPP) preforms e.g. CEVOTECH technology; Non-woven, isotropic or anisotropic fibre layers e.g. RECATEX Recycled Carbon Fiber Nonwovens; Isotropic fibre arrangement; an isotropic fibre arrangement; fillers; glass microspheres; hydrophobic fumed silica; epoxy resin/hardener; milled carbon fibre, comminuted carbon fibre (for example chopped or cut carbon fibre) or a combination thereof.

In exemplary embodiments, the shaped preform component is formed from:

(i) a mixture of resin, milled carbon fibre and hollow glass microspheres;
(ii) a mixture of resin and milled carbon fibres;
(iii) a mixture of resin and comminuted carbon fibre, preferably chopped carbon fibre; or
(iv) substantially resin only.

It should be appreciated that the resin also includes a content of hardener.

In some embodiments, that composition further includes 1 to 5 wt %, preferably 1 to 2 wt % hydrophobic fumed silica.

It should be appreciated that any suitable milled carbon fibre could be used. In some embodiments, the milled carbon fibres have a length of <500 micron length, preferably less than 100 micron, more preferably between 50 and 200 micron. For example, a milled carbon fibre of 100 micron length could be used such as Carbiso™ MF. However, it should be appreciated that any brand of milled carbon fibre could be suitable. Other fibre types of similar length could be used.

In other embodiments, a comminuted carbon fibre can be used, for example a chopped carbon fibre. This comminuted carbon fibre can have a length less than 20 mm, preferably less than 15 mm, more preferably between 1 and 15 mm. For example, a comminuted carbon fibre of about 12 mm length could be used. Other fibre types of similar length could be used.

The preferred material (Option A, B or C) is a mixture of mixed resin & hardener, hollow glass microspheres, Milled Carbon fibre and Hydrophobic fumed silica in the following ratio (parts by mass):

| | Mixed Resin & Hardener | Milled Carbon Fibre | Chopped Carbon Fibre* | Hollow Glass Microspheres | Hydrophobic fumed silica (optional) |
|---|---|---|---|---|---|
| Option A | 500 | 100 | 0 | 180 | 1-2 wt % of total mixture |
| Option B | 300 | 100 | 0 | 0 | 1-2 wt % of total mixture |
| Option C | 375 | 100 | 0 | 56 | 1-2 wt % of total mixture |
| Option D | 300 | 0 | 100 | 0 | about 1 wt % of total mixture |

*12 mm chopped carbon fibre

In an exemplary embodiment, the shaped preform component is formed from a material comprising a mixture of ratio (parts by mass) of 3.75:1:0.56 Mixed Resin:Milled carbon fibre:Hollow Glass Microspheres. In embodiments, the ratio (parts by mass) of Mixed Resin:Milled carbon fibre is from 2.5:1 to 5:1, preferably between 3:1 to 4:1. In embodiments, the ratio (parts by mass) of Milled carbon fibre:Hollow Glass Microspheres is from 1:0.4 to 1:0.7, preferably between 1:0.5 to 1:0.6.

A variety of suitable hollow glass microspheres could be used in the composition of the shaped preform. The hollow glass microspheres preferably comprise hollow glass spheres having thin walls. The hollow glass microspheres can be formed from a variety of glass materials, including (but not limited to) Soda-lime-borate silicate glass. The softening temperature of the hollow glass microspheres are preferably at least 500° C., more preferably at least 600° C., yet more preferably about 600° C. The hollow glass microspheres preferably have a size of from 10 to 200 microns, more preferably from 18 to 65 microns. Furthermore, the hollow glass microspheres preferably have a target crush strength (90% survival) of from 250 to 28000 psi, more preferably from 250 to 6000 psi, and yet more preferably from 250 to 3000 psi. Additionally, the hollow glass microspheres preferably have a true density of 0.125 to 0.60 g/cc, preferably from 0.125 to 0.4 g/cc, and yet more preferably from 0.125 to 0.28 g/cc. In one exemplary embodiment, the hollow glass microspheres comprise 3M S28HS glass bubbles (available from 3M Advanced Material Division) that have an average diameter of 30 micron and a crush strength (90% survival by volume) of 3000 psi and a true density of 0.28 gram per cc. However, it should be appreciated that other similar microspheres could also be used. For example, alternative hollow microspheres such as the 3M K1 bubble having a 250 PSI target crush strength and 0.125 gram per cc true density) or 3M IM30K (or similar) that has a crush strength of 28000 psi and a true density of 0.60 g/cc could be used.

Where fibre based materials are used, the shaped preform can be formed from at least one of: fibre layers, fibre plies, prepregs, semi-pregs, woven or non-woven fabrics, mats, preforms, pre-consolidated pre-forms, individual or groups of fibres, tows, or tow-pregs.

It is to be understood that prepreg refers to a substantially or fully impregnated collection of fibres, fibre tows, woven or non-woven fabric or the like. Similarly, it is to be understood that semi-preg refers to a partially impregnated collection of fibres or fibre tows. The partial impregnation provides for enhanced removal of gas through or along the dry fibres during consolidation and/or curing. An example of a semi-preg is a partially impregnated layer of fibres.

It is to be understood that woven and non-woven fabrics are collections of individual fibres or fibre tows which are substantially dry, i.e. not impregnated by a matrix material, such as resin. It should also be understood that fibre tows are bundles of a large number of individual fibres, for example 1000's, 10000's or 100000's of fibres. Tow-pregs are at least partially impregnated fibre tows.

A wide variety of fibres may be used in the present invention, including but not limited to fibres selected from the group consisting of carbon fibres, glass fibres, aramid fibres, synthetic fibres such as acrylic, polyester, PAN, PET, PE, PP or PBO-fibres, or the like, bio fibres such as hemp, jute, cellulose fibres, or the like, mineral fibres for example Rockwool or the like, metal fibres for example steel, aluminium, brass, copper, or the like, boron fibres or any combination of these. In a preferred embodiment, the fibres comprise carbon fibres. The fibres may be provided in any desirable orientation in the transition zone like for example unidirectional, biaxial or random or a combination of these. However, the fibres are preferably oriented to reduce the stress between the composite members as well as to strengthen areas of the final structure which will be exposed to a higher stress during service. The orientation of fibres may or may not be the same in all the layers comprising fibres within the transition zone. For example, one or more layers of fibres may be oriented in another manner than other layers, if a stress analysis suggests a multi-axial fibre orientation. However, in other embodiments the fibres may be oriented substantially the same way in all the layers of fibres.

It should be appreciated that the shaped preform component should be formed of a material that that ensures minimum volumetric change when used in forming the face portion of a composite wheel. Where that material comprises fibre arrangements (for example isotropic fibre arrangements), fibre layers, fibre plies, prepregs, semi-pregs, woven or non-woven fabrics, mats, preforms, pre-consolidated pre-forms, individual or groups of fibres, tows, or tow-pregs, that material is preferably processed to provide the requisite compressibility properties, and thus minimum volumetric change in subsequent processing steps.

The method of formation of the shaped preform typically involves the following general steps:

laying up or otherwise forming the desired shape of the shaped preform with the selected composite fibre material in a cooperatively shaped mould;

providing a matrix material in contact with the laid up material in the mould to form a matrix material introduced body; and curing the matrix introduced body.

The laid up material is typically infused with the matrix material so that that matrix material permeates through the material. The shaped preform therefore typically further comprises a curable matrix material enveloping the comprising components of the shaped preform. Once moulded and formed into the shaped preform, the shaped preform includes a matrix material which binds the fibres and other comprising material together. During lay-up (preparing up to the point before consolidation and/or setting, curing or the like of the matrix material), the matrix material need not be comprised in the layers which include the fibres (e.g. a prepreg or semi-preg) or between the layers comprising fibres. However, the matrix material should form a continuous matrix after setting occurs. Suitable matrix material can be selected from (but are not limited to) a resin based on unsaturated polyester, polyurethane, polyvinyl ester, epoxy, thermoplastics, or combinations thereof.

It should be appreciated that the curing step can be controlled to provide the desired mechanical properties, including stiffness and compressibility. The mechanical properties of the shaped preform can be designed to suit a particular application. These properties can be varied through selection of the constituent materials forming the shaped preform, the matrix material, amount of matrix material injected or included therein, and the cure regime (cure time, temperature, whether the body is fully cured). In some instances it is desirable to stop the curing process before the shaped preform is fully cured, so as to produce surface properties which assist the adherence of subsequent layup material when used in the layup of the face portion of a composite wheel.

Advantageously, the surface of the shaped preform is preferably designed to adhere to rest of structure used to form the composite wheel. In embodiments, the surface of the shaped preform is configured to assist adherence of carbon fibre or material including carbon fibre thereon. As described above, the surface of the shaped preform preferably has a roughened surface having a roughness of at least Ra=0.2 μm. The roughened surface can be formed by any suitable means. In some embodiments, the roughened surface comprises a chemically etched surface, a mechanically abraded surface or a mechanically featured surface.

The surface properties of the shaped preform can be modified through altering the curing properties and regime of the shaped preform. In some embodiments, the shaped preform comprises an incomplete or under-cured preform. However, again it must be appreciated that the shaped preform is cured and otherwise processed to provide a selected compressibility that provides minimum volumetric change in subsequent fibre layup and moulding processing steps.

The shaped preform is typically formed with a designed shape and geometry which provides a basis for forming the geometry (in some cases complex geometry) of the face portion (hub and spokes) of the required composite wheel. As can be appreciated, a number of features of the face portion and particularly the hub need to be included to service the functional requirements of attaching the composite wheel to a wheel mount of a vehicle and include branding or other indicia. For example, the hub preferably includes at least one aperture. That aperture could be for receiving wheel bolts or a center lock bolt or a brand or indicia button, insert or cap. Any number of apertures can be included in the hub. In embodiments, the hub includes at least three apertures spaced apart about the central axis, preferably at least four apertures spaced apart about the central axis, preferably at least five apertures. In some embodiments, the hub includes a central aperture. That central aperture can have a smooth internal wall, or in some embodiments, where a body such as a cap or plug is to be retained therein, may include a step forming a rim or flange at one end of the aperture. That rim or flange forms a stop preventing the cap or plug from passing through the aperture.

The hub can have any suitable configuration. In embodiments, the hub is generally circular in shape about the central axis. However, it should be appreciated that the hub could have any number of other shapes, particularly regular polygonal shapes including squares, pentagons, hexagons, octagons or the like. In some embodiments, the hub includes a first side having a generally planar surface and a second side, opposite the first side, having a generally concave or recessed surface.

In preferred embodiments, the shaped preform includes a plurality of fingers that are annularly spaced apart about the central axis and which extend radially outwardly from the perimeter of the hub away from the central axis. The function of the fingers is to provide a connection member linking the spokes of the face portion to the hub thereof. The number of fingers therefore preferably corresponds to the number of spokes formed in the face portion of the composite wheel. The fingers similarly can have any suitable configuration. In some embodiments, the fingers comprise tapered protrusions that extend outwardly from the perimeter of the hub. Each finger is preferably equally spaced apart from each other finger about the central axis. Each finger preferably has a curved section situated therebetween each adjoining finger. In some embodiments, the fingers comprise surfaces which slope downwardly from the perimeter of the planar surface of the hub towards a distal end of each finger.

The shaped preform can additionally include a number of features designed to assist subsequent formation and layup of a face portion of a composite wheel. These features include (but are not limited to):
fibre ply retention formations;
guide lines to visually indicate the location that the edges of a ply should be located; or holding/manipulation formations for optimising handling of the shaped preform.

The present invention provides in a second aspect, a method of forming a face portion of a composite fibre wheel, comprising:
locating a shaped preform according to any one of the preceding claims in the hub portion of the fibre layup of a face portion of a composite fibre; and
laying up composite fibre elements around the shaped preform thereby forming a pre-moulded structure of the face portion of a composite fibre wheel.

The shaped preform, fibres and fibre elements of the fibre layup of the face portion are preferably injected and/or impregnated with matrix material and then cured, set or the like. The face portion therefore preferably further comprises a matrix material enveloping the fibre layup and comprising fibres and fibre elements. Any suitable matrix material can be used. In some embodiments, a resin is used. The resin is preferably based on unsaturated polyester, polyurethane, polyvinyl ester, epoxy, thermoplastics, similar chemical compounds or combinations thereof. In a preferred embodiment, the resin is epoxy-based. In other embodiments, the matrix material comprises a metal matrix, forming a composite metal matrix with the fibres when set. The metal matrix material is preferably selected from aluminium, magnesium, titanium, iron and combinations, alloys and mixtures thereof. Once moulded and formed into a composite wheel, the face portion comprises a matrix material, such as resin, metal, and fibres.

The fibre layup of the face portion is preferably injection and/or impregnated with a curable matrix material and then cured and/or set. The method therefore preferably further includes the steps of:
providing a matrix material in contact with pre-moulded structure of the face portion; and
curing the face portion.

The surface of the shaped preform is preferably activated to allow it to bond with the surrounding material when the matrix material is injected/impregnated. Activation is typically a surface marking procedure, for example, this could be achieved by chemical etch, mechanical abrasion or the like.

The shaped preform is preferably integrally formed with the composite wheel. Moreover, the composite wheel is preferably formed as a unitary body. This typically involves simultaneous injection and/or impregnation of matrix material and then curing, setting or the like of each portion of the composite wheel. In such embodiments, each of the rim portion and the face portion are preferably at least partially uncured at the time when the connection is prepared. The connection portion is preferably integrally formed with the composite wheel. In such embodiments, the method further includes the steps of:
concurrently providing a matrix material in contact with each rim portion and the face portion of the wheel; and
co-curing the rim portion and the face portion of the wheel.

It should be appreciated that curing of the matrix material and the associate part such as the face portion, rim portion, unitary composite wheel or similar encompasses curing, setting, drying or similar processes.

Where the matrix material comprises a resin, a variety of resin delivery systems can be used with the method of the second aspect. In some embodiments, at least a part of the resin is provided by Resin Infusion and/or Resin Transfer Moulding and/or Vacuum Assisted Resin Transfer Moulding.

The fibres and fibre elements of the fibre layup of the face portion of the composite wheel preferably comprise carbon fibre fibres. However, again it should be appreciated that a wide variety of fibres may be used in the present invention, including but not limited to fibres selected from the group consisting of carbon fibres, glass fibres, aramid fibres, synthetic fibres such as acrylic, polyester, PAN, PET, PE, PP or PBO-fibres, or the like, bio fibres such as hemp, jute, cellulose fibres, or the like, mineral fibres for example Rockwool or the like, metal fibres for example steel, aluminium, brass, copper, or the like, boron fibres or any combination of these. In a preferred embodiment, the fibres comprise carbon fibres. The fibres may be provided in any desirable orientation in the transition zone like for example unidirectional, biaxial or random or a combination of these. However, the fibres are preferably oriented to reduce the stress between the composite members as well as to strengthen areas of the final structure which will be exposed to a higher stress during service. The orientation of fibres may or may not be the same in all the layers comprising fibres within the transition zone. For example, one or more layers of fibres may be oriented in another manner than other layers, if a stress analysis suggests a multi-axial fibre orientation. However, in other embodiments the fibres may be oriented substantially the same way in all the layers of fibres.

The fibre elements may be provided in any suitable form including in prepregs, semi-pregs, woven or non-woven fabrics, mats, pre-forms, pre-consolidated pre-forms, individual or groups of fibres, tows, tow-pregs, or the like. In embodiments, the fibre elements are provided as at least one fabric sheet, preferably a multi-axial fabric. During lay-up (preparing up to the point before consolidation and/or setting, curing or the like of the matrix material) of a connection, the matrix material need not be comprised in the layers comprising fibres (e.g. a prepreg or semi-preg) or between the layers comprising fibres. However, the matrix material should form a continuous matrix after setting occurs.

The face portion can be formed the face portion is formed from tailored fibre preform having a desired shape and fibre orientation which includes the shaped preform of the present invention. The tailored fibre preform is formed having a desired shape and fibre orientation. It is to be understood that a preform is a composite material comprising fibres. In some instances the preform may also include an uncured matrix material such as a resin. Some preforms may substantially comprise dry fibres with no matrix material. A binder may be used to assist holding the plies together before the matrix material has been injected.

A third aspect of the present invention provides a composite wheel including a shaped preform according to the first aspect of the present invention. In some embodiments, the composite wheel is formed about a central wheel axis.

BRIEF DESCRIPTION OF THE DRAWINGS

The present invention will now be described with reference to the figures of the accompanying drawings, which illustrate particular preferred embodiments of the present invention, wherein.

DETAILED DESCRIPTION

Figure 1:
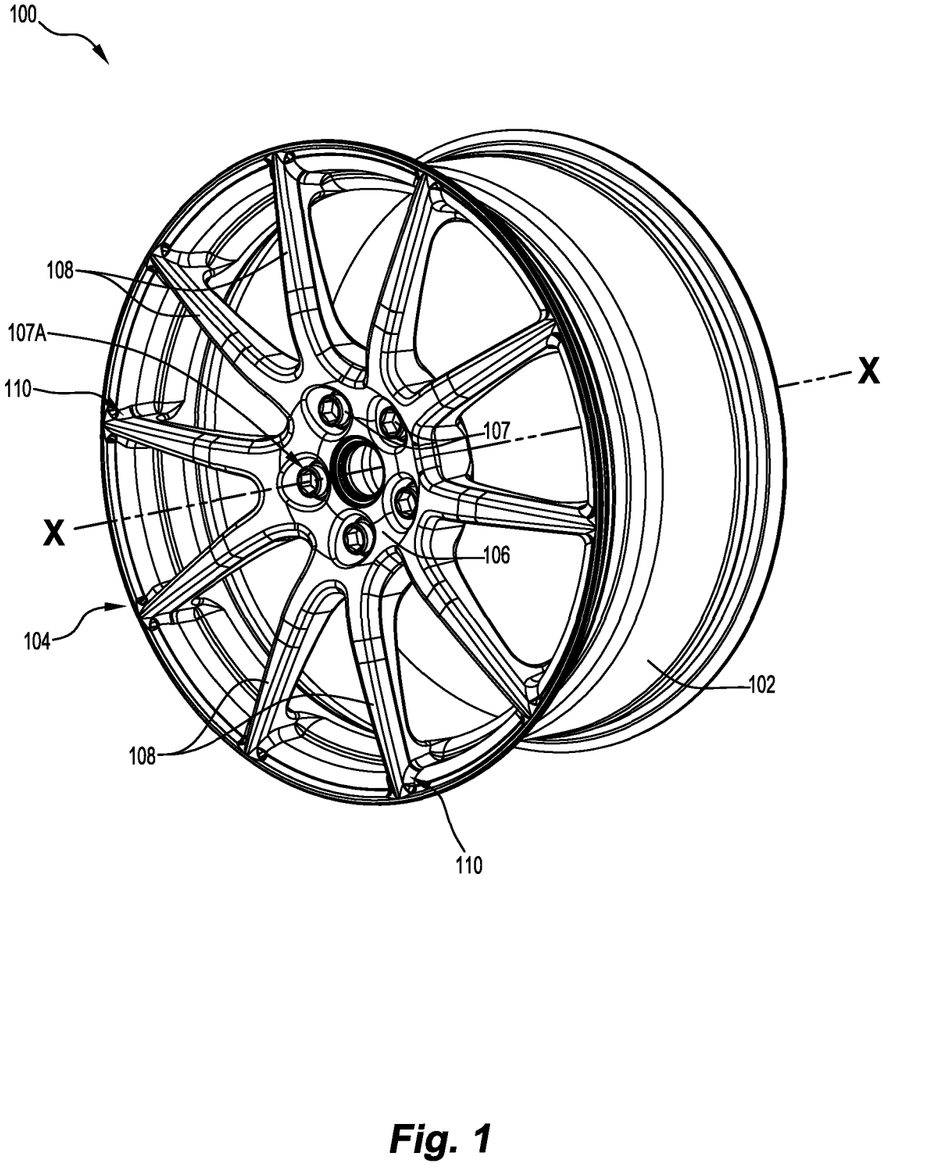
FIG. 1 is a perspective view of a composite wheel including a connection between a face portion and rim portion thereof according to one embodiment of the present invention.

Referring firstly to FIG. 1, there is shown a perspective view of a composite wheel 100 which has been formed and integrally includes the shaped preform 200 of the present invention. The illustrated composite wheel 100 has been developed by the Applicant as a composite wheel formed as a one-piece body. The general process of manufacture of the composite wheel 100 is described in International Patent Publication WO2010/024495A1, the contents of which are to be understood to be incorporated into this specification by this reference.

The illustrated composite wheel 100 includes two main sections:

A). a rim portion 102 comprises an annulus structure onto which a tyre (not illustrated) is mounted; and B). a face portion 104 comprising a circular hub 106 and a series of spokes 108. The hub 106 includes five fastening apertures 107 (shown with fastening bolts 107A in place in FIGS. 1 and 2) configured to receive fastening bolts (not illustrated) used to fix the wheel to a wheel mount of a vehicle (not illustrated). The spokes 108 comprise elongate arms connected to the hub 106 at one end and the rim portion 102 at another end.

It should be appreciated that other composite wheel configurations are possible, for example center lock composite wheel 100A which has a face portion 104A including a hub 106A that has a center locking aperture 107A configured to receive a center lock fastening bolt (not illustrated) to fix the wheel to a center lock wheel mount of a vehicle (not shown).

As described in International Patent Publication WO2010/024495A1, the creation of such a one-piece composite wheel 100 necessitates use of a separate rim portion mould (not illustrated) and a face portion mould (not illustrated). In use, the rim portion 102 is formed by laying up a first set of fibres typically embodied in a reinforcement fabric seated in the rim portion mould, and the face portion 104 is formed by separately laying up a second set of fibres, typically embodied in a reinforcement fabric seated in the face portion mould. The rim portion mould includes an inner bucket mould and an outer cylindrical mould. The reinforcement fabric from the rim portion mould and face portion mould are then assembled together in a combined mould, with the separate portions being interconnected at a connection point 110. A final moulding process is then undertaken in which matrix material, such as a resin, is injected and/or infused into the reinforcement of the overall wheel form to produce a moulded single piece wheel 100.

The shape and configuration of the face portion 104, in particular the hub 106, can be formed from lay-up in the face portion mould. However, in the case of the present invention, the formation of features can be aided in the layup through the use of a shaped preform 200 (FIGS. 3 and 4) which can be located in place in the mould and the layup be formed there-around.

Figure 2:
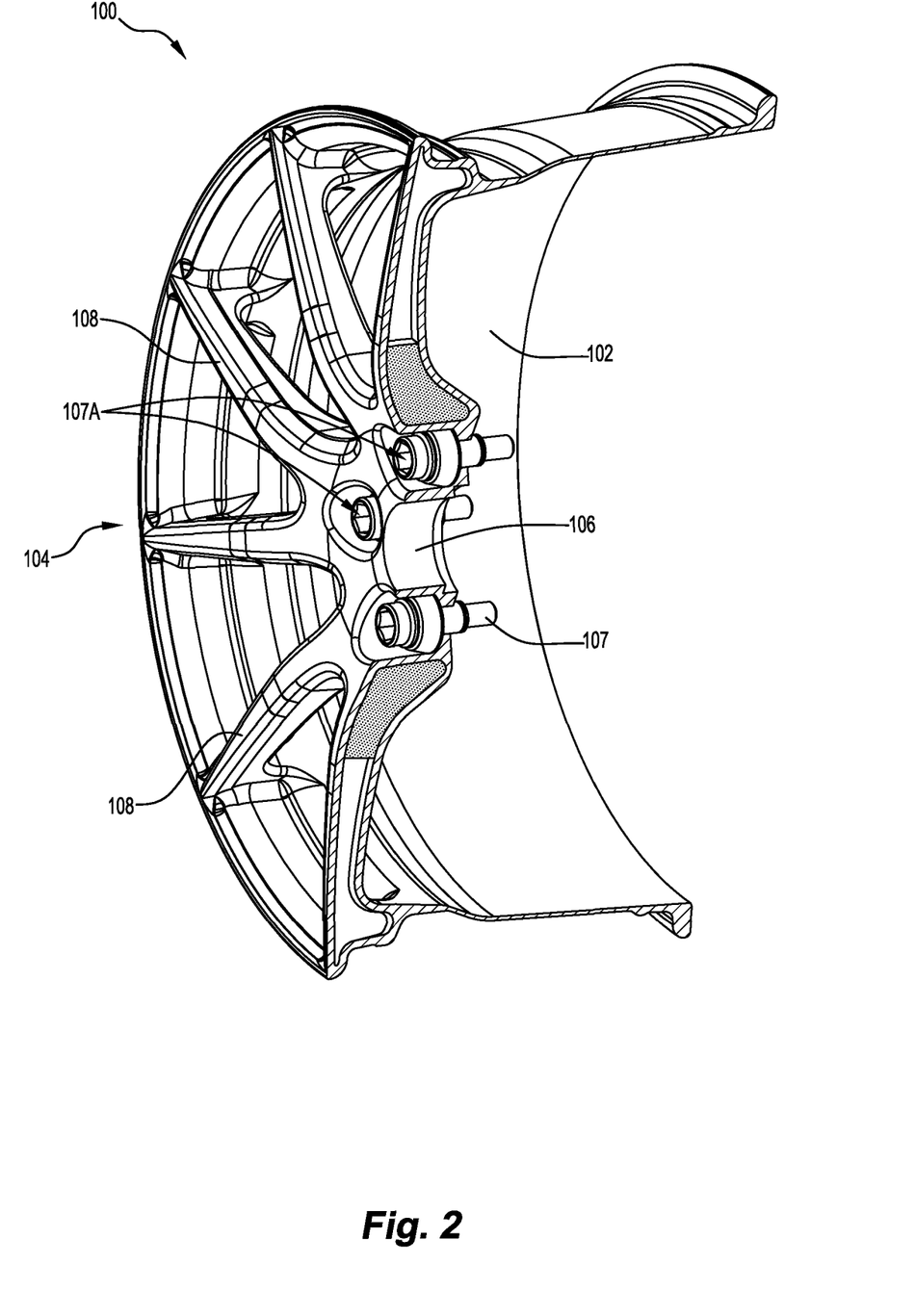
FIG. 2 is a more detailed view of the rim to face connection region of the composite wheel shown in FIG. 1.
Figure 2A:
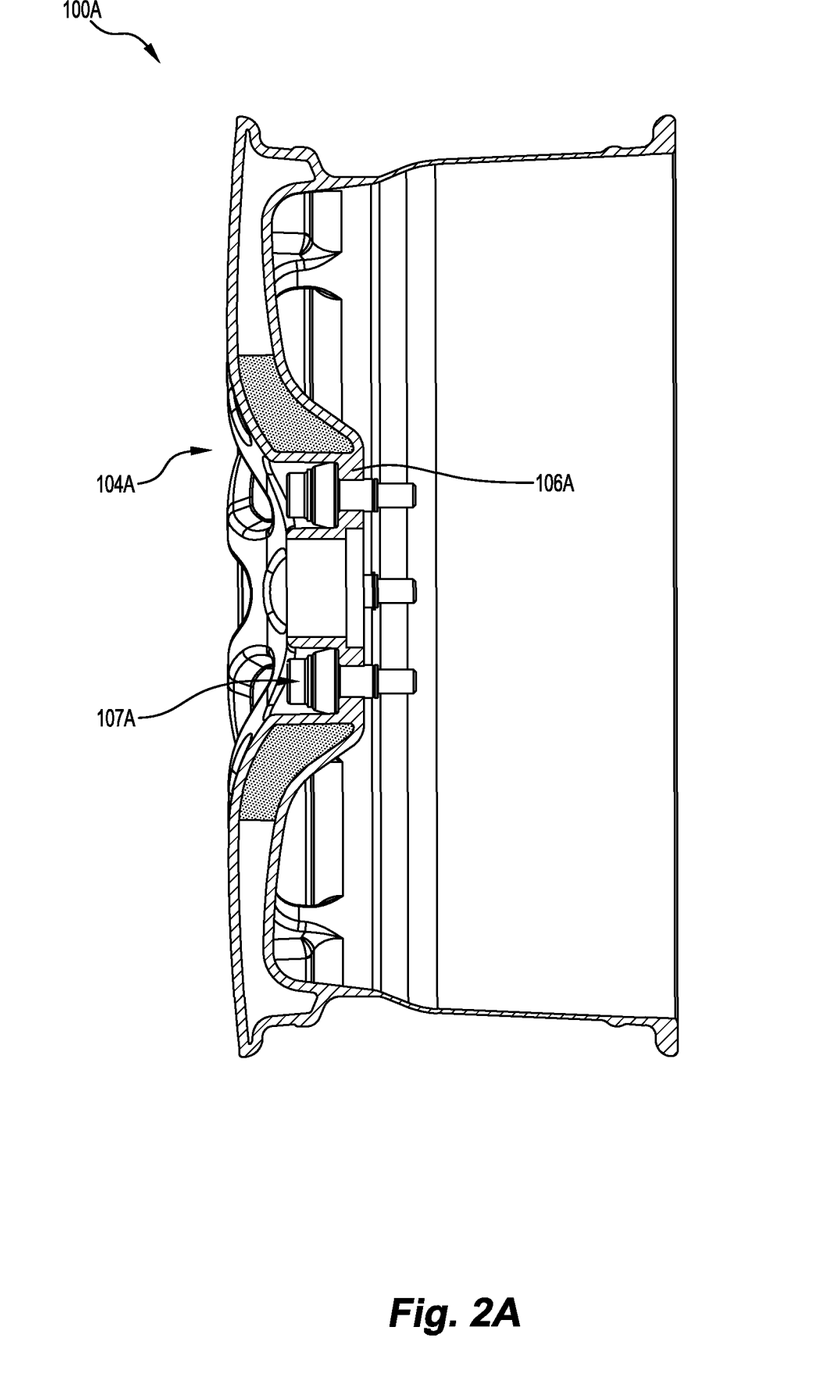
FIG. 2A provides a cross-sectional view of a center lock composite wheel configuration.
Figure 3:
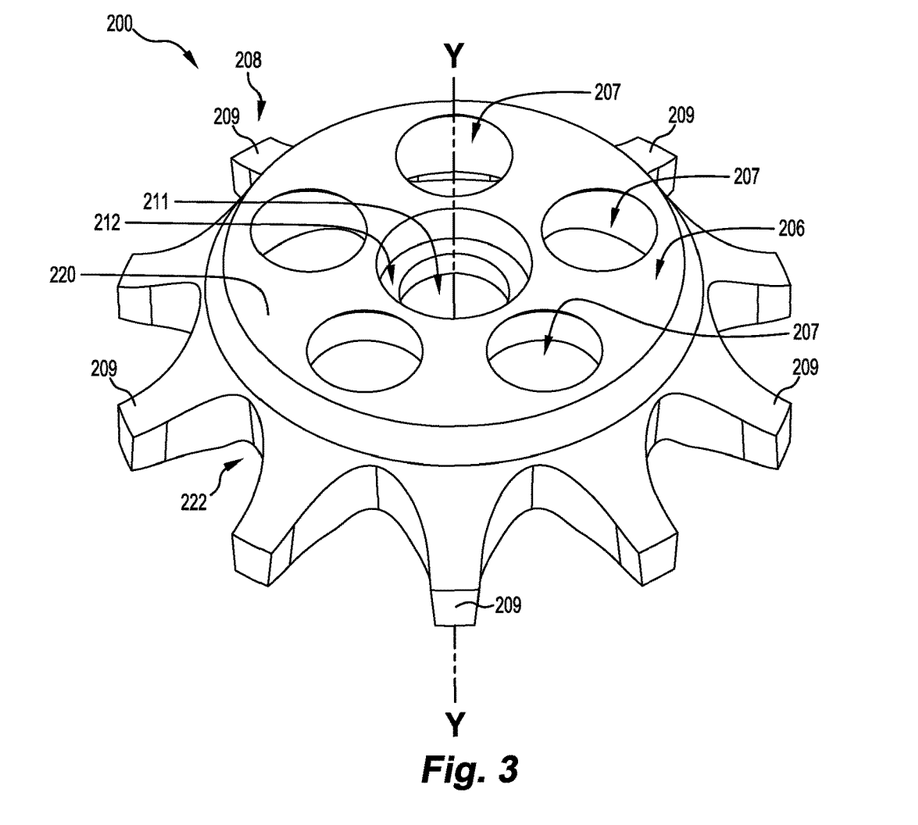
FIG. 3 provides an isometric top view of a shaped preform according to an embodiment of the present invention.
Figure 4:
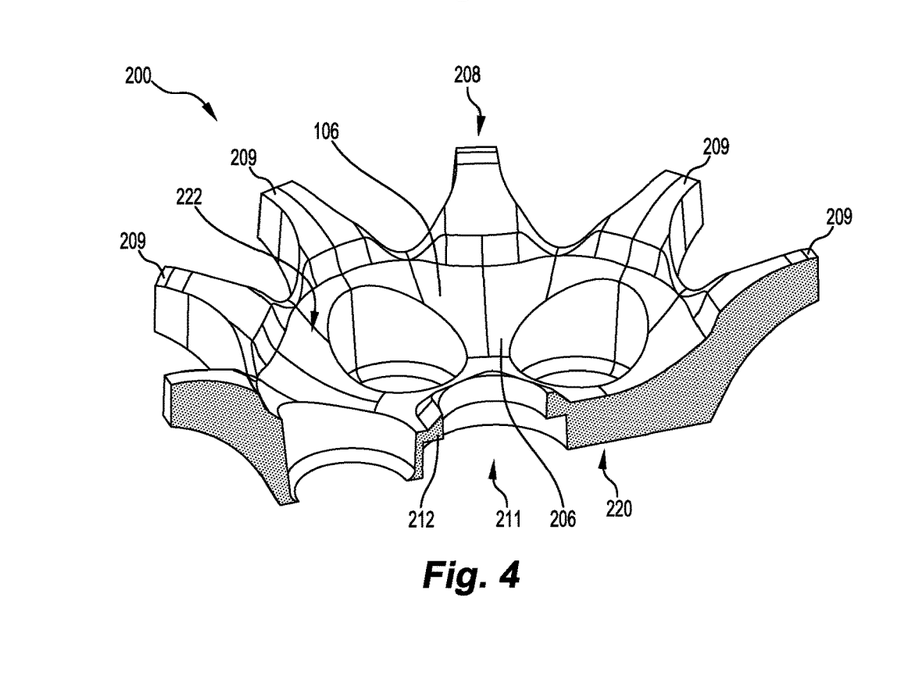
FIG. 4 provides a side cross-sectional view of the shaped preform shown in FIG. 3.

FIGS. 3 and 4 show one example of a shaped preform insert 200 for use in the layup and formation of a face portion 104 of a composite wheel 100 such as shown in FIGS. 1 and 2. The illustrated shaped preform 200 is used to provide the shape and configuration of the hub 106 and hub 106 to spoke 108 connections of that face portion 104. Thus, the illustrated shape preform has a circular hub section 206 that extends around a central axis Y-Y and a spoke connection section 208 that comprises a plurality of fingers 209 that are annularly spaced apart about the central axis Y-Y and which extend radially outwardly from the perimeter of the hub section 2016 away from the central axis Y-Y. It should be appreciated that the shaped preform can be alternatively configured to provide the required shape and configuration for center lock wheel 100A shown in FIG. 2A.

The exact geometric configuration of the hub section 206 and spoke connection section 208 depends on the intended configuration of the composite wheel 200. For example, the number of spokes 108 can vary, affecting the configuration of the spoke connection section 208. Moreover, the type of wheel mount fitment may change depending on the functional requirements of attaching the composite wheel 100 to a wheel mount of a vehicle and include branding or other indicia in the configuration of the wheel. For example, a center lock wheel mount would have a different configuration to a bolted wheel mount. The number of and configuration of the wheel bolts can vary also. In the illustrated embodiments, the hub portion 206 includes five apertures 207 spaced apart about the central axis Y-Y which are used to form the fastener apertures 107 (FIGS. 1 and 2), and a central aperture 211. That central aperture 211 includes a step 212 forming a rim or flange that provides a stop which can be used to retain and prevent the cap or plug from passing through the central aperture 211. The hub includes a first side 220 having a generally planar surface which forms the rear side of the hub 106 in the composite wheel 100, and a second concave or recessed side 222 which forms the features of the front side of the hub 106 in the composite wheel 100.

The spoke connection section 208 include ten annularly spaced apart fingers 209. The function of the fingers 209 is to provide a connection member linking the spokes of the face portion to the hub thereof. The number of fingers 209 corresponds to the number of spokes formed in the face portion 104 of the composite wheel 100. As illustrated, the fingers 209 comprise tapered protrusions that extend outwardly from the perimeter of the hub section 206. As shown in FIG. 3, on the first side 220, the fingers 209 slope downwardly from the perimeter of the planar surface of the hub section 206 towards a distal end of each finger 209. A similar slope is provided on the second side 222 away from the perimeter of the recessed surface of the hub section 206. Each finger 209 is separated by an arched recess about the axis Y-Y.

Whilst not illustrated, the shaped preform 206 could be shaped/configured to include a number of additional features designed to assist subsequent formation and layup of a face portion of a composite wheel. These features include (but are not limited to): fibre ply retention formations such as steps, recesses, slots or the like; guide lines to visually indicate the location that the edges of a ply should be located; or holding/manipulation formations for optimising handling of the shaped preform such as recesses, flanges, apertures, ribs, hooks, protrusions or the like.

The shaped preform 200 is formed from a cured composite fibre material having a compressibility of <2%, preferably <1% volumetric under moulding conditions of 50 bar hydrostatic pressure at process temperatures of from 60 to 200° C., preferably 60 to 150° C., more preferably 60 to 140° C. By cured, it is to be understood that the cured composite fibre material has undergone at least a partial curing process to harden or cure a curable matrix material, such as a resin, in that composite fibre material. The cured composite fibre material provides structural rigidity and/or solidity to the preform providing limited compressibility to enable the provision of an appropriate volume and minimal volume change during layup and moulding of the face portion of the composite wheel.

Whilst not wishing to be limited by any one theory, the shaped preform 200 is designed to provide a core material (see FIG. 7) that can be used in layup and curing process of a composite wheel 100 to provide an alternate load path for the forces in the structure of the hub section 206. The mechanical and material properties of the shaped perform are also selected to minimise structural loading and stresses resulting from material incompatibility and volume change during layup, curing and post cure processes when forming a composite wheel.

Figure 5:
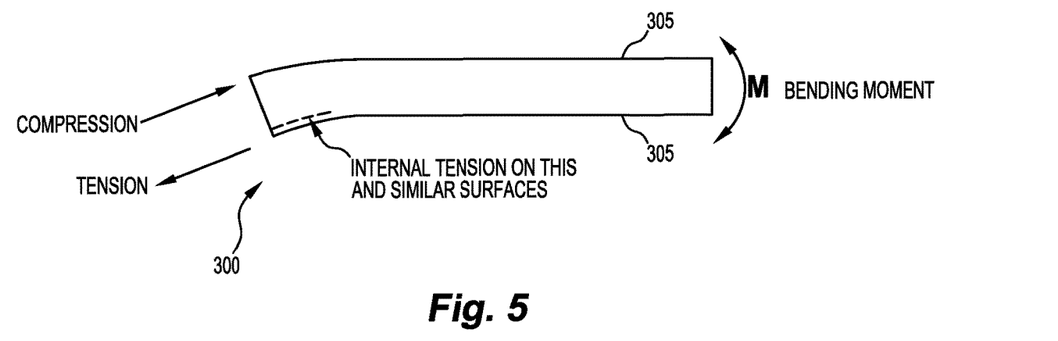
FIG. 5 provides a schematic diagram illustrating stresses resulting in a curved beam from an applied force.

Beams, for example beam 300 in FIG. 5, carry bending by tension and opposing compression stresses in the members (flanges 305) of the beam 300 which are distant from the neutral axis of the beam 300. When a beam 300 has a curved region these tension and compression stresses along the axis of the beam 300 in turn create through thickness stresses that are either tensile or compressive dependent on the loading direction (bending moment M) as shown in FIG. 5.

Figure 6:
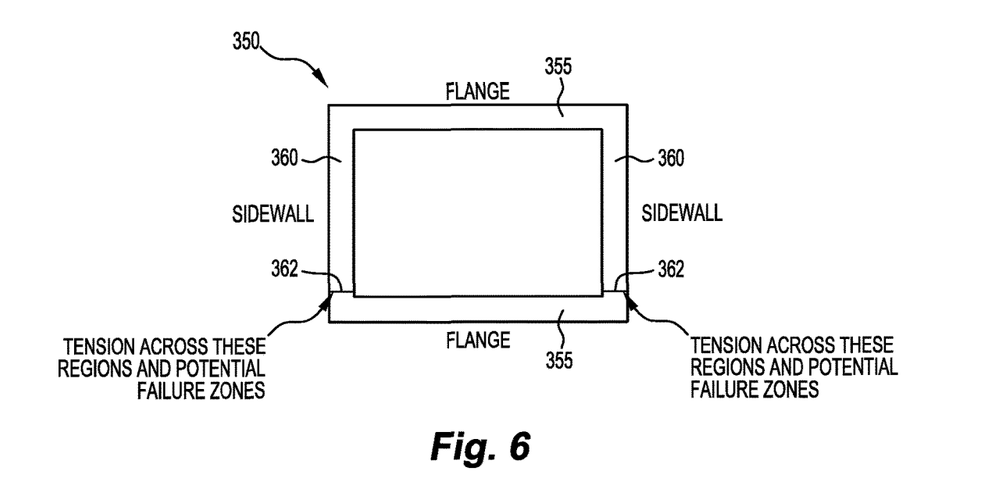
FIG. 6 provides a schematic diagram of a hollow core body.

A body or beam 350 having a hollow or soft core configuration has a similar behaviour to beam 300, where the through thickness tensile stresses sum to create forces which have a tendency to separate the outer flanges 355 from the rest of the body 350. These forces can create stresses in the connection 362 between the flanges 355 and sidewalls 360 of the body 350 that can be the limiting factor to the bending strength of the body 350 as shown in FIG. 6. This limitation is particularly evident with a composite body that may have significantly less strength in the axial direction than in the thickness direction. The extent of the limitation is significantly dependent upon the cross sectional proportions of the body. The greater the width of the body in comparison to its height the greater is the forces tending to separate the flanges from the sidewalls.

Figure 7:
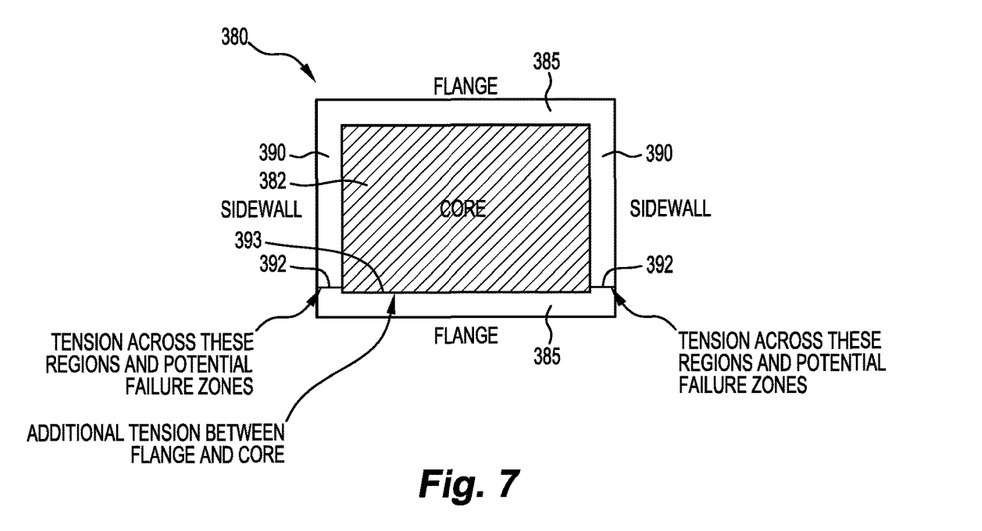
FIG. 7 provides a schematic diagram of a filled core body, including a shaped preform.

The present invention seeks to address this limitation through the addition of an appropriate core 382 (i.e. shaped preform 200) to the inside of the body 380. The purpose of the core 382 is to provide an alternate load path for the forces attempting to separate the flange 385 from the rest of the body 380. A portion of the separation forces can be directly transferred to the core as tensile stresses (for example as tension 393 between the flange and the core) that partially unload the connection 392 between the flange 385 and the sidewalls 390. Partially unloading the flange-to-sidewall connection 392 increases the strength and hence load capacity of the body 380 as shown in FIG. 7.

The mechanical properties of the shaped preform 200 are designed to obtain optimal mechanical and material performance. A shaped preform 200 with insufficient tensile modulus in the thickness direction of the body will be ineffective at unloading the flange to sidewall connection and hence be of little structural value. Whereas a shaped preform 200 with excessive tensile modulus in the thickness direction of the body will lead to excessive through thickness stress in the flange as it attempts to separate from the shaped preform 200 and result in failure within the flange itself or at the connection between flange and shaped preform 200. An appropriately designed shaped preform 200 will unload the flange to sidewall connection without creating excessive through thickness stress in the flange.

Any number of different composite fibre material could be used which include or can be bound by a curable matrix material, for example a resin to form the cured composite fibre material. In some embodiments, the shaped preform is formed from resin (pure resin) or is substantially formed from resin only. In embodiments, the shaped preform is formed from at least one of: Tailored Fibre Placement plies or preforms; One or more layers of Single fibre direction plies (Unidirectional); One or more layers of multi directional fibre plies (e.g. stitched Non-crimp fabric); or Fibre Patch Placement (FPP) preforms e.g. CEVOTECH technology; Non-woven, isotropic or anisotropic fibre layers e.g. RECATEX Recycled Carbon Fiber Nonwovens; Isotropic fibre arrangement; Fillers; Glass microspheres; hydrophobic fumed silica; epoxy resin/hardener; milled carbon fibre, or a combination thereof.

In preferred forms the shaped preform component is formed from:

(i) a mixture of resin, milled carbon fibre and hollow glass microspheres.

(ii) a mixture of resin and milled carbon fibres.

(iii) a mixture of resin and comminuted carbon fibres.

Each of (i) and (ii) can optionally include 1 to 5 wt %, preferably 1 to 2 wt % hydrophobic fumed silica. It should be appreciated that the resin in the above preferred forms also includes a content of hardener.

In some embodiments, the milled carbon fibres have a length of <500 micron length, preferably less than 100 micron. For example, a milled carbon fibre of 100 micron length could be used such as Carbiso™ MF. However, it should be appreciated that any brand of milled carbon fibre could be suitable. Other fibre types of similar length could be used.

In embodiments, the comminuted carbon fibres comprise chopped carbon fibre having a length of less than 20 mm, preferably less than 15 mm, for example between 1 and 15 mm. In particular embodiments, a comminuted carbon fibre of about 12 mm length could be used.

One preferred material is provided as Option A and Option B below in a table 1 (ratios are in parts per mass):

TABLE 1

Example shaped preform compositions

| | Mixed Resin & Hardener | Milled Carbon Fibre | Chopped Carbon Fibre* | Hollow Glass Microspheres | Hydrophobic fumed silica (optional) |
|---|---|---|---|---|---|
| Option A | 500 | 100 | 0 | 180 | 1-2 wt % of total mixture |
| Option B | 300 | 100 | 0 | 0 | 1-2 wt % of total mixture |
| Option C | 375 | 100 | 0 | 56 | 1-2 wt % of total mixture |
| Option D | 300 | 0 | 100 | 0 | about 1 wt % of total mixture |

In more detail, option C can comprise:
3.75 parts epoxy resin;
1 part milled carbon fibre of 100 micron length; and
0.56 parts hollow glass microspheres.
In more detail, option D can comprise:
3 parts epoxy resin and hardener; and
1 part chopped carbon fibre of 12 mm length.

The microspheres comprise 3M S28HS glass bubbles available from 3M Advanced Material Division. These glass bubbles comprise hollow spheres with thin walls made from Soda-lime-borate silicate glass having an average diameter of 30 micron and a crush strength (90% survival by volume) of 3000 psi and a true density of 0.28 gram per cc. However, it should be appreciated that other similar microspheres could also be used. For example, alternative hollow microspheres such as the 3M K1 bubble having a 250 PSI target crush strength and 0.125 gram per cc true density) or 3M IM30K (or similar) that has a crush strength of 28000 psi and a true density of 0.60 g/cc could be used. A selection of possible 3M microspheres that can be used are provided in Table 2:

TABLE 2

3M Hollow Glass Microspheres (Glass Bubbles) that may also be used in the present invention:

| | Target Crush Strength (90% survival, psi) | True Density | Typical Particle Size (microns, by volume) Distribution | | | Colour (unaided eye) |
|---|---|---|---|---|---|---|
| | | | 10th % | 50th % | 90th % | |
| K1 | 250 | 0.125 | 30 | 65 | 115 | white |
| K15 | 300 | 0.15 | 30 | 60 | 105 | white |
| S15 | 300 | 0.15 | 25 | 55 | 90 | white |
| S22 | 400 | 0.22 | 20 | 35 | 65 | white |
| K20 | 500 | 0.20 | 25 | 55 | 95 | white |
| K25 | 750 | 0.25 | 25 | 55 | 90 | white |
| S32 | 2000 | 0.32 | 20 | 40 | 7 | white |
| S35 | 3000 | 0.35 | 10 | 40 | 75 | white |
| K37 | 3000 | 0.37 | 20 | 45 | 80 | white |
| XLD3000 | 3000 | 0.23 | 15 | 30 | 40 | white |
| S38 | 4000 | 0.38 | 15 | 40 | 75 | white |
| S38HS | 5500 | 0.38 | 15 | 40 | 75 | white |
| S38XHS | 5500 | 0.38 | 15 | 40 | 70 | white |
| K46 | 6000 | 0.46 | 15 | 40 | 70 | white |
| K42HS | 7500 | 0.42 | 11 | 22 | 37 | white |
| S60 | 10000 | 0.60 | 15 | 30 | 55 | white |
| S60HS | 18000 | 0.60 | 11 | 30 | 50 | white |
| iM16K | 16000 | 0.46 | 12 | 20 | 30 | white |
| iM30K | 28000 | 0.60 | 9 | 16 | 25 | white |

It should be appreciated that alternative mix ratios to those provided in Option A and Option B above may also provide a satisfactory composition.

In an exemplary embodiment, the shaped preform component is formed from a mixture of ratio (parts by mass) of 3.75:1:0.56 mixed Resin:Milled Carbon fibre:Hollow Glass Microspheres.

In the illustrated embodiment, the fibres in the cured composite fibre material of the composite wheel 100 comprise carbon fibres. However, it should be appreciated that a wide variety of fibres may be used in the present invention, including but not limited to fibres selected from the group consisting of carbon fibres, glass fibres, aramid fibres, synthetic fibres such as acrylic, polyester, PAN, PET, PE, PP or PBO-fibres, or the like, bio fibres such as hemp, jute, cellulose fibres, or the like, mineral fibres for example Rockwool or the like, metal fibres for example steel, aluminium, brass, copper, or the like, boron fibres or any combination of these.

It should be appreciated that the thermal expansion properties of the shaped preform 200 are designed to be similar to and preferably substantially match the thermal expansion properties of the overall composite material of the face portion of a composite wheel that the shaped preform 200 is configured to be included therein. Matching thermal expansion properties avoid damage such as delamination of the parts (shaped preform and the surrounding laminated material in post cure processes).

The composite material (typically a carbon fibre laminate) that is formed adjacent to the shaped preform during the moulding process must adhere to the shaped preform. The shaped preform material type must enable this, for example the shaped preform can use epoxy resin but typically should not use Polypropylene. After moulding of the shaped preform, and prior to layup of the shaped preform, the shaped preform surface must be activated to allow it to bond with the subsequent injection operation—this could be achieved by chemical etch, mechanical abrasion or the like.

Other mechanical properties of the shaped preform 200 of interest include:
- Density—which is preferably between 600 and 1300 kg/m$^3$, and more preferably from 800 to 1200 kg/m$^3$;
- Tensile Strength—which is preferably between 20 and 80 MPa, more preferably from 20 and 60 MPa;
- Stiffness—which is preferably from 1.5 to 30 GPa, more preferably 10 to 25 GPa. In some embodiments the stiffness is from 1.5 to 10 GPa. In other embodiments, the stiffness is from 8 to 30 GPa.

In some embodiments, the shaped preform has a stiffness of about 4 GPa and a tensile strength of about 50 MPa. However, it should be appreciated that these may vary depending on the material, wheel configuration and desired properties of a specific composite wheel.

The illustrated shaped preform 200 is formed by a standard composite moulding process. In this process, the preferred material composition described above in Table 1 is metered and mixed and then injected into a closed, heated mould. The mould is at 120° C. and once filled, the mould is held at 120° C. for 10 minutes to cure the resin. The puck is then demoulded and moved to the surface preparation step. The cooperatively shaped mould has a mould cavity shaped to provide the desired shape and configuration of the shaped preform 200. Suitable matrix material can be selected from (but are not limited to) a resin based on unsaturated polyester, polyurethane, polyvinyl ester, epoxy, thermoplastics, or combinations thereof.

The curing step can be controlled to provide the desired mechanical properties, including stiffness, surface properties and compressibility. The mechanical properties of the shaped preform 200 can therefore be designed to suit a particular application. However, it must be appreciated that the shaped preform 200 is cured and otherwise processed to provide a selected compressibility that provides minimum volumetric change in subsequent fibre layup and moulding processing steps forming the face portion 104 of the composite wheel 200.

As noted above, the cured shaped preform 200 is used as a layup aid or insert in the layup of the face portion 104 of a composite wheel 100. In this process, the shaped preform 200 is located in the hub portion of the fibre layup of a face portion mould; and the composite fibre elements of the face portion 104 are laid up around the shaped preform 200 thereby forming a pre-moulded structure of the face portion of a composite fibre wheel.

Again, the fibres elements of the face portion layup may be provided in any suitable form including in prepregs, semi-pregs, woven or non-woven fabrics, mats, pre-forms, pre-consolidated pre-forms, individual or groups of fibres, tows, tow-pregs, or the like. During lay-up, a matrix material, such as a resin need not be comprised in the layers comprising fibres or between the layers comprising fibres. However, the matrix material should form a continuous matrix after curing.

The illustrated composite wheel 100 (FIGS. 1 and 2) is intended to be formed as a unitary body. This involves simultaneous injection and/or impregnation of a matrix material, which in the exemplary embodiment is a resin, into all parts including the rim portion 102, and face portion 104 and then curing of each of the portions of the composite wheel 100. The resin used is preferably epoxy-based. However, it should be understood that any suitable resin can be used for example unsaturated polyester, polyurethane, polyvinyl ester, epoxy, thermoplastics, similar chemical compounds or combinations thereof. A variety of resin delivery systems can be used including, but not limited to Resin Infusion and/or Resin Transfer Moulding and/or Vacuum Assisted Resin Transfer Moulding.

In constructing a composite wheel illustrated in FIGS. 1 and 2, the wheel includes three main mould faces. Firstly, a face mould, which is generally radially orientated relative to the axis of rotation of the wheel X-X. Secondly, an inner bucket mould face, which forms the inside face of the wheel 140 (FIG. 2). The inner bucket mould face includes a front face forming the back mould wall of the face portion which is radially orientated relative to the axis of rotation of the wheel X-X and side walls forming the back mould wall of the rim portion that are axially aligned to the axis of rotation of the wheel X-X. Thirdly, the rim moulds are substantially axially aligned to the axis of rotation of the wheel X-X.

In use, the rim portion 102 and face portion 104 are laid up with reinforcement and then a connection between the rim portion 102 and face portion 104 is laid up with reinforcement. After forming the connection, a resin is injected and/or impregnated into the reinforcement of each of the rim portion 102, the face portion 104 of the wheel 100 and then allowed to cure.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:

1. A shaped preform component for a face portion of a composite wheel, the shaped preform comprising:
   a hub that extends around a central axis, wherein:
   the shaped preform component is formed from a cured composite fibre material having a compressibility of <2% volumetric under moulding conditions of 50 bar hydrostatic pressure and a temperature of 60 to 200° C., and
   the shaped preform comprises at least one of:
   (i) Tailored Fibre Placement plies or preforms;
   (ii) at least one layer of single fibre direction plies;
   (iii) at least one layer of multi directional fibre plies;
   (iv) Fibre Patch Placement preforms;
   (v) at least one layer of non-woven, isotropic or anisotropic fibres;
   (vi) an isotropic fibre arrangement;

(vii) at least one filler;
(viii) glass microspheres;
(ix) hydrophobic fumed silica;
(x) epoxy resin/hardener;
(xi) comminuted carbon fibre,
(xii) milled carbon fibre, or
(xiii) a combination thereof.

2. The shaped preform component according to claim 1, further comprising:
a plurality of fingers that are annularly spaced apart about the central axis and which extend radially outwardly from a perimeter of the hub away from the central axis.

3. The shaped preform component according to claim 2, wherein a quantity of the fingers corresponds to a quantity of spokes formed in the face portion of the composite wheel.

4. The shaped preform component according to claim 1, wherein:
the compressibility of the cured composite fibre material is <1% volumetric under moulding conditions of 50 bar hydrostatic pressure.

5. The shaped preform component according to claim 1, wherein:
the shaped preform has a density in a range of 600 to 1300 kg/m$^3$.

6. The shaped preform component according to claim 1, wherein the shaped preform has at least one of:
a tensile strength in a range of 20 to 80 MPa; or
a stiffness in a range of 1.5 to 30 GPa.

7. The shaped preform component according to claim 1, wherein a surface of the shaped preform has a roughened surface having a roughness of at least 0.2 μm (Ra).

8. The shaped preform component according to claim 1, wherein the milled carbon fibres have a length of less than 20 mm.

9. The shaped preform component according to claim 1, further comprising:
a curable matrix material enveloping components of which the shaped preform is comprised, wherein the matrix material comprises a resin based on unsaturated polyester, polyurethane, polyvinyl ester, epoxy, thermoplastics, or a combination thereof.

10. The shaped preform component according to claim 1, having thermal properties designed to substantially match the thermal properties of an overall composite material of the face portion of a composite wheel in which the shaped preform is configured to be included.

11. The shaped preform component according to claim 1, wherein the shaped preform comprises an incomplete or under-cured preform.

12. The shaped preform component according to claim 1, wherein the hub is generally circular in shape about the central axis and includes at least one aperture.

13. The shaped preform component according to claim 1, wherein the hub includes a central aperture, and includes a step forming a rim or flange at one end of the aperture.

14. The shaped preform component according to claim 1, wherein the hub includes a first side having a generally planar surface and a second side, opposite the first side, having a generally concave or recessed surface.

15. The shaped preform component according to claim 14, further comprising:
a plurality of fingers that are annularly spaced apart about the central axis and which extend radially outwardly from a perimeter of the hub away from the central axis, wherein the fingers comprise surfaces which taper or slope downwardly from a perimeter of the planar surface of the hub towards a distal end of each finger.

16. A method of forming a face portion of a composite wheel, comprising:
locating a shaped preform according to any claim 1 in a hub portion of a fibre layup of the face portion of the composite wheel; and
laying up composite fibre elements around the shaped preform thereby forming a pre-moulded structure of the face portion of a composite wheel.

17. A composite wheel comprising a shaped preform according to claim 1.

18. A shaped preform component for a face portion of a composite wheel, the shaped preform comprising:
a hub that extends around a central axis, wherein:
the shaped preform component is formed from a cured composite fibre material having a compressibility of <2% volumetric under moulding conditions of 50 bar hydrostatic pressure and a temperature of 60 to 200° C., and
the shaped preform comprises one of:
(i) a mixture of resin, milled carbon fibre and hollow glass microspheres;
(ii) a mixture of resin and milled carbon fibre;
(iii) a mixture of resin and comminuted carbon fibre; or
(iv) substantially resin only.

19. The shaped preform component according to claim 18, wherein the shaped preform further comprises 1 to 5 wt % hydrophobic fumed silica.

20. A composite wheel comprising a shaped preform according to claim 18.

* * * * *